July 19, 1966 W. MALTNER ETAL 3,262,019
PIEZOELECTRIC DEVICE
Filed Sept. 14, 1964
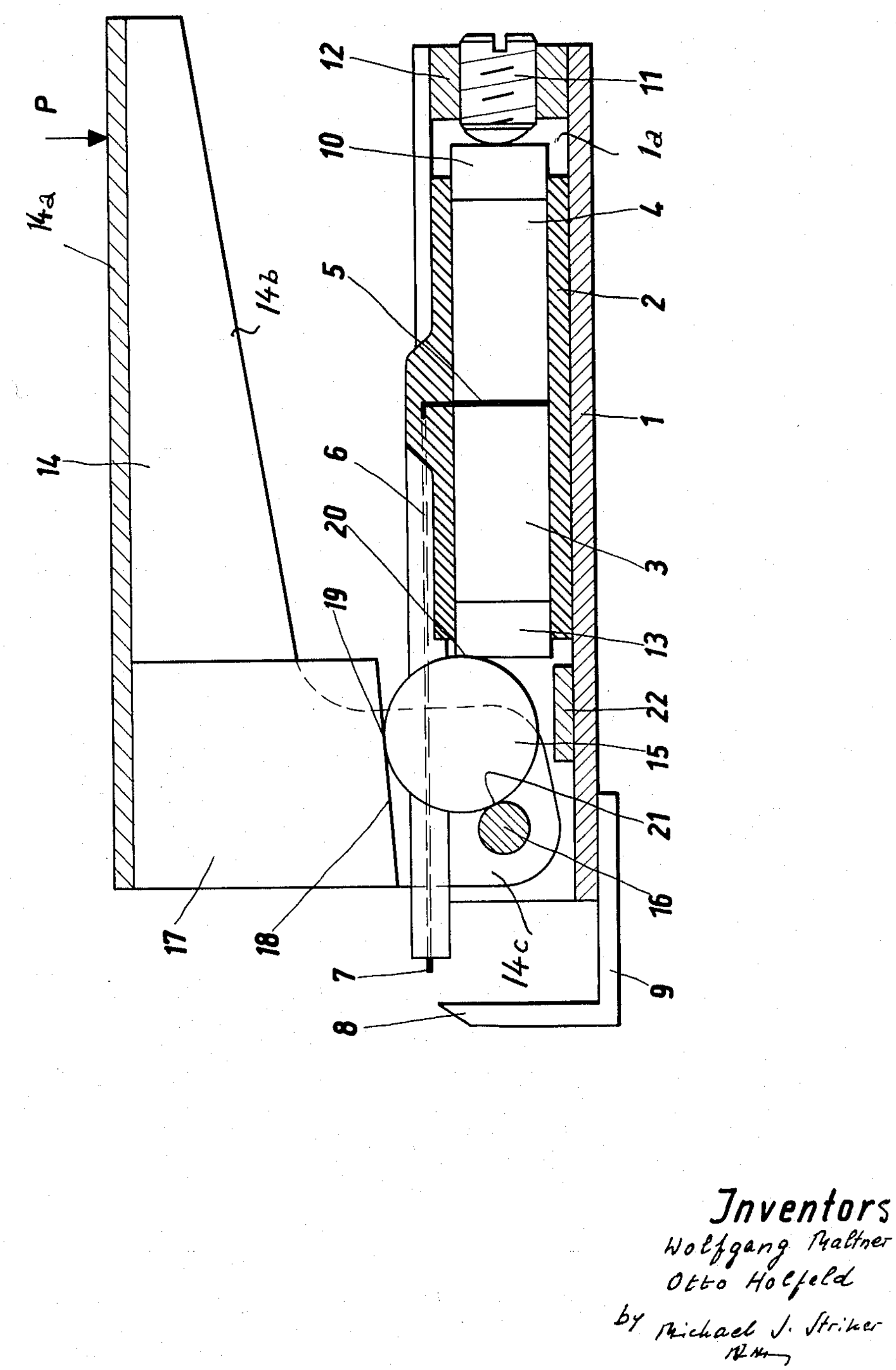
Jnventors
Wolfgang Maltner
Otto Holfeld
by Michael J. Striker
Atty

United States Patent Office 3,262,019
Patented July 19, 1966

3,262,019

PIEZOELECTRIC DEVICE

Wolfgang Maltner, Oberstedten, Taunus, and Otto Holfeld, Dudenhofen, Germany, assignors to Heinrich Maltner G.m.b.H., Offenbach (Main), Germany Filed Sept. 14, 1964, Ser. No. 396,073
Claims priority, application Germany, Sept. 25, 1963, M 58,333
14 Claims. (Cl. 317—96)

The present invention relates to a piezoelectric device, and more particularly to a piezoelectiric ignition device for a lighter.

Ignition devices are known in which electrodes forming a spark gap are electrically connected to a piezoelectric crystal transducer. When sufficient pressure is exerted on the piezoelectric crystal along the piezoelectric axis thereof, a voltage of several kilovolts is created which is sufficient to cause a spark between the electrodes. When it is desired to produce the necessary high pressure by a manual operation, a transmission of some sort is required by which the manual force is multiplied.

A simple lever multiplies the manual force, but is generally not sufficient to produce the necessary high pressure. It has been proposed to arrange an intermediate lever, mounted for pivotal movement on a fixed support or on the manually operated lever and acting on the piezoelectric crystal. However, the very high forces occurring during operation require a very strong construction of the levers and associated pivots, and as a consequence the devices of the known art are heavy and not suitable for use in a lighter. Furthermore, the precise assembly of the necessary lever transmission system results in high manufacturing costs.

It is one object of the present invention to overcome the disadvantages of known force transmitting devices for the actuation of piezoelectric transducers, and to provide a piezoelectric device which can be actuated by comparatively small manual force to produce a voltage.

Another object of the invention is to provide a manually operated force transmitting arrangement for a piezoelectric device which is of simple construction, can be economically manufactured, and has a long span of useful life.

Another object of the invention is to provide a manually actuated piezoelectric device in which the force is transmitted to the piezoelectric crystals by a force transmitting member which is not pivotally mounted so that bearings and journals necessary in the known constructions are eliminated.

With these objects in view, a piezoelectric device according to one embodiment of the invention comprises supporting means; piezoelectric crystal means movably disposed on the supporting means and having one end abutting the same; a manually operated member, such as a lever pivotally mounted on the supporting means; a force transmitting member, preferably a cylindrical member loosely touching the manually operated member, the supporting means, and the other end of the piezoelectric crystal means at three spaced points.

The force transmitting member has such a shape as to be wedged between the supporting means and the piezoelectric crystal means when a force is applied thereto by the manually operated member.

Due to the wedge action of the force transmitting member a greater force is transmitted by the same to the piezoelectric crystal means than is exerted on the force transmitting member by the manually operated member. A reasonable manual force applied to the manually operated member will produce such a pressure on the piezoelectric crystal means that the same creates a voltage.

The points of the piezoelectric crystal means between which the voltage develops are connected to a pair of electrodes forming a spark gap so that a spark can be produced by manual pressure exerted on the device, as is desirable for lighter constructions using piezoelectric crystals as source of voltage, instead of a battery.

A force transmitting arrangement according to the present invention multiplies the manual force at least to the same extent as any other known force transmitting device serving the same purpose, but a single manually operated member with a single journal and bearing is sufficient for producing the desired result. The loosely mounted force transmitting member can be constructed much smaller and sturdier than the second pivoted lever of known constructions, and the necessity of providing a second journal and second bearing is eliminated. As a result, the device of the present invention is not only simpler than the known constructions, but also lighter, and can be easily assembled. Furthermore, most of the wear will occur on the force transmitting member, which can be easily exchanged without any tools by an unskilled person due to the fact that it is loosely and freely mounted.

A surprising result of the construction of the present invention is that a loosely mounted force transmitting member, all other conditions being equal, will produce a higher voltage on the piezoelectric crystal than a known two lever construction having the same force multiplying ratio.

In the preferred embodiment of the invention, the pivot on which the manually operated lever is mounted on the supporting means is used for providing an abutment for the force transmitting member on the supporting means. The force transmitting member is then wedged between the pivot and the end of the piezoelectric crystal.

In the preferred embodiment of the present invention, the force transmitting member is a circular or cylindrical disc whos diameter is slightly greater than the distance between the points where the disc abuts the supporting means, or the pivot, and the piezoelectric crystal. When such a circular disc is inserted into the device it assumes the correct position between the manually operated lever, the pivot, and the piezoelectric crystal automatically and in a fool proof manner. The circular disc can be used in any position turned about its center, and when three peripheral points of the disc are worn, the same is simply turned a small angle so that three unused circular surface portions are engaged by the manually operated lever, the pivot means and the piezoelectric crystal. However, during normal operations, the circular disc will slightly turn every time pressure is exerted thereon so that the circular peripheral surface of discs will be uniformly worn.

Instead of a circular or cylindrical disc, a spherical ball can be used which has the disadvantage, however, that the point contact results in high specific pressures at the three engaged positions of the periphery of the ball.

The circular force transmitting member will be gradually worn so that its diameter is reduced. When the diameter becomes less than the distance between the abutment points on the supporting means, such as the pivot of the manually operated lever and the piezoelectric crystal, the force transmitting member would slip between these two abutment points, and consequently an abutment is provided on the supporting means to limit movement of the circular force transmitting member so that the same cannot be jammed between the supporting pivot and a piezoelectric crystal, or become inoperative. When the force transmitting member begins to rest on the abutment it must be exchanged for new force transmitting member which will exert the desired wedge effect, or the distance between the supporting pivot and the piezoelectric crystal must be reduced, by suitable adjustment means.

For example, the end of the piezoelectric crystal remote from the force transmitting member may be supported by an adjustable screw mounted on the supporting means.

The novel features which are considered as characteristics for the invention are set forth in particular in the appended claims. The invention itself, however, both as to its construction and its method of operation, together with additional objects and advantages thereof, will be best understood from the following description of a specific embodiment when read in connection with the accompanying drawing whose single figure is a longitudinal sectional view illustrating a piezoelectric device according to one embodiment of the invention.

Referring now to the drawing, a support 1 of U-shaped cross section forms a channel *1a* in which an insulating body 2 is mounted. Two piezoelectric crystals 3 and 4 of cylindrical shape are mounted in a cylindrical cavity of the insulating body 2. A contact plate 5 is located between the inner ends of the piezoelectric crystals 3 and 4 and extends into a projecting portion of the insulating body 2 where it is connected by an insulated wire to an electrode 7. Another electrode 8 is constituted by the pointed end of an angular member 9 which is secured to the bottom portion of the U-shaped support 1 by conventional means, not shown. Metal end plates 10 and 13 are mounted in the cylindrical cavity of insulating body 2 abutting the free ends of the piezoelectric crystals 3 and 4. An abutment member 12 is fixed to the end of the U-shaped support 1 and has a threaded bore in which an adjusting screw 11 is disposed.

A pivot pin 16 is mounted on the other end of the U-shaped support 1 spaced a predetermined distance from the free end face of end plate 13. A manually operated lever 14 has a U-shaped inverted cross section and includes a top wall 14*a*, two dependent lateral walls 14*b* forming a handle portion of lever 14, and two parallel lateral leg portions 14*c* provided with bearing bores through which pivot pin 16 passes so that the manually operated lever is turnable about the axis of pivot 16. A block 17 is inserted between the leg portions 14*c* abutting the inner surface of the top wall 14*a*, and having an abutment face 18 which is slanted to the direction of top wall 14*a*.

A circular or cylindrical disc 15 having a diameter greater than the distance between pivot pin 16 and the end face of end plate 13 is inserted into the free space between leg portions 14*c* and the slanted abutment face 18. Due to the greater diameter of disc 15, the same cannot slip through between pivot 16 and end plate 13, but will be wedged between a narrow surface portion 21 of pin 16, and narrow surface portion 20, of end plate 13, and a narrow surface portion 19 of block 17 when pressure is exerted in the direction of the arrow P on the manually operated lever 14.

The force acting at point 19 is a multiple of the manual force exerted on lever 14 since the lever arm between point 19 and the axis of pivot pin 16 is shorter than the lever arm on which the manual force acts. Due to the wedge action of the circular disc 15, the force transmitted at point 20 to end plate 13 and the piezoelectric crystals 3 and 4 is substantially greater than the force acting at point 19, depending on the angles defined between the cylindrical periphery of force transmitting disc 15 and surface portions 21 and 20. Consequently, the pressure exerted by a finger on lever 14 is sufficient to produce such a compressing force acting on the piezoelectric crystals 3 and 4 that the same are excited to produce a voltage sufficient for a spark between electrodes 7 and 8. It will be understood that the device is shown on a greatly enlarged scale, and that a practical embodiment has such a size as to be adapted to be built into a lighter.

When lever 14 is released, the piezoelectric crystals extend resiliently and urge force transmitting disc 15 back to its initial positions so that lever 14 is slightly raised. Spring means urging lever 14 to turn in counterclockwise direction, or urging force transmitting disc upwardly as viewed in the drawing, may be provided for aiding the effects of the expanding piezoelectric crystals 3 and 4 in returning the force transmitting disc 15 to its initial position in which no pressure is exerted on the piezoelectric crystals. Abutment face 18 is slanted to the direction of the force exerted by block 17 on the force transmitting disc 15 so that the same is urged toward end plate 13.

An abutment plate 22 is secured to the bottom portion of support 1 to limit movement of forced transmitting disc when the same is worn and the diameter of its peripheral cylindrical surface reduced. When disc 15 rests on abutment plate 22 upon operation of lever 14 while no spark is produced, the device must be adjusted by turning screw 11 and shifting the piezoelectric crystal means 3 and 4 together with end plates 10 and 13 toward pivot pin 16 so that the distance between surface portions 21 and 20 is reduced sufficiently to hold the cylindrical force transmitting disc in its proper initial position in which it does not engage abutment plate 22. However, when the disc is badly worn, it is simply exchanged for a new disc.

The metal end plates 10 and 13 are connected by the metal of the supporting means 1, 16, 12, 11, and by disc 15 to each other so that the outer ends of the piezoelectric crystals 3 and 4 are connected, and since both inner ends engage contact plate 15, the piezoelectric crystals 3 and 4 are connected in parallel.

The illustrated embodiment is particularly suited for attachment to a lighter casing since it is of narrow elongated shape and little height. The construction is sturdy, of low weight, and operates reliably to produce the voltage necessary for igniting gas emitted by the nozzle of a gas lighter.

It will be understood that each of the elements described above, or two or more together, may also find a useful application in other types of piezoelectric device differing from the types described above.

While the invention has been illustrated and described as embodied in a piezoelectric device including a loosely mounted circular force transmitting member, it is not intended to be limited to the details shown, since various modifications and structural changes may be made without in any way departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. A piezoelectric device comprising supporting means; piezoelectric crystal means disposed on said supporting means and having one end abutting said supporting means; a manually operated member movably mounted on said supporting means; and a force transmitting member loosely touching said manually operated member, said supporting means, and the other end of said piezoelectric crystal means at three spaced points thereof, said force transmitting member having such a shape as to be wedged between said supporting means and said piezoelectric crystal means when a force is applied thereto by said manually operated member whereby a greater force is transmitted by said force transmitting member to said piezoelectric crystal means than is exerted on said force transmitting member by said manually operated member and a voltage is created by said piezoelectric crystal means.

2. A piezoelectric device comprising supporting means· piezoelectric crystal means disposed on said supporting means and having one end abutting said supporting means; a pivot pin mounted on said supporting means; a manually operated lever mounted on said pivot pin for turning movement; and a force transmitting member loosely touching said manually operated lever, said supporting means, and the other end of said piezoelectric crystal means at three spaced points thereof, said force transmitting member having such a shape as to be wedged between said supporting means and said piezoelectric crystal means when a force is applied thereto by said manually operated lever whereby a greater force is transmitted by said force transmitting member to said piezoelectric crystal means than is exerted on said force transmitting member by said manually operated lever and a voltage is created by said piezoelectric crystal means.

3. A piezoelectric device comprising supporting means; piezoelectric crystal means disposed on said supporting means and having one end abutting said supporting means; a manually operated member movably mounted on said supporting means; and a circular force transmitting member loosely touching said manually operated member, said supporting means and the other end of said piezoelectric crystal means at three spaced peripheral points thereof, said force transmitting member having such a shape as to be wedged between said supporting means and said piezoelectric crystal means when a force is applied thereto by said manually operated member whereby a greater force is transmitted by said force transmitting member to said piezoelectric crystal means than is exerted on said force transmitting member by said manually operated member and a voltage is created by said piezoelectric crystal means.

4. A piezoelectric device comprising supporting means; piezoelectric crystal means disposed on said supporting means and having one end abutting said supporting means; a manually operated member movably mounted on said supporting means; a force transmitting member loosely touching said manually operated member, said supporting means, and the other end of said piezoelectric crystal means at three spaced points thereof, said force transmitting member having such a shape as to be wedged between said supporting means and said piezoelectric crystal means when a force is applied thereto by said manually operated member whereby a greater force is transmitted by said force transmitting member to said piezoelectric crystal means than is exerted on said force transmitting member by said manually operated member and a voltage is created by said piezoelectric crystal means; and an abutment secured to said supporting means on the side of said force transmitting member remote from said manually operated member.

5. A piezoelectric device comprising supporting means; piezoelectric crystal means disposed on said supporting means and having one end abutting said supporting means; a pivot pin mounted on said supporting means; a manually operated lever mounted on said pivot pin for turning movement; and a circular force transmitting member loosely touching said manually operated lever, said supporting means, and the other end of said piezoelectric crystal means at three spaced peripheral points thereof, said force transmitting member having such a shape as to be wedged between said supporting means and said piezoelectric crystal means when a force is applied thereto by said manually operated lever whereby a greater force is transmitted by said force transmitting member to said piezoelectric crystal means than is exerted on said force transmitting member by said manually operated lever and a voltage is created by said piezoelectric crystal means.

6. A piezoelectric device comprising supporting means; piezoelectric crystal means disposed on said supporting means and having one end abutting said supporting means; a manually operated member movably mounted on said supporting means; and a spherical force transmitting member loosely touching said manually operated member, said supporting means, and the other end of said piezoelectric crystal means at three spaced points thereof, said force transmitting member having such a shape as to be wedged between said supporting means and said piezoelectric crystal means when a force is applied thereto by said manually operated member whereby a greater force is transmitted by said force transmitting member to said piezoelectric crystal means than is exerted on said force transmitting member by said manually operated member and a voltage is created by said piezoelectric crystal means.

7. A piezoelectric device comprising supporting means including an elongated support forming an elongated channel, an abutment member closing one end of said channel, and a transverse pivot pin mounted at the other end of said channel; piezoelectric crystal means disposed in said channel and having one end abutting said abutment member; a manually operated lever having a handle portion extending in the direction of said support, and a second portion mounted on said pivot pin for turning movement, said lever having an abutment face; and a circular force transmitting member loosely touching said abutment face of said lever, said pivot pin, and the other end of said piezoelectric crystal means at three spaced surface portions of its circular periphery, said force transmitting member having a diameter slightly greater than the distance between said surface portion of said pivot pin and said surface portion of said piezoelectric crystal means so as to be wedged between said pivot pin and said piezoelectric crystal means when a force is applied to the remaining third peripheral surface portion thereof by said abutment face of said lever whereby a greater force is transmitted by said force transmitting member to said piezoelectric crystal means than is exerted on said force transmitting member by said lever and a voltage is created by said piezoelectric crystal means.

8. A piezoelectric device as set forth in claim 7 and including an adjustment screw mounted on said abutment member at the end of said support and engaging said piezoelectric crystal means whereby the position of said piezoelectric crystal means can be adjusted for varying the distance between said pivot pin and the other end of said piezoelectric crystal means in accordance with the diameter of said force transmitting member.

9. A piezoelectric device as set forth in claim 7 wherein said manually operated lever includes a substantially U-shaped part including two lateral portions mounted on said pivot pin, and an abutment block between said lateral portions having a slanted face engaging said force transmitting member.

10. A piezoelectric device as set forth in claim 7 and including a pair of end plates respectively abutting the ends of said piezoelectric crystal means, one of said end plates abutting said abutment member of said supporting means, and the other end plate abutting said force transmitting member.

11. A piezoelectric device as set forth in claim 7 wherein said piezoelectric crystal means include two piezoelectric crystals arranged in end-to-end relation, a contact plate between the adjacent ends of said piezoelectric crystals; a first electrode electrically connected to said contact plate; and a second electrode electrically connected with the outer ends of said piezoelectric crystals and forming a spark gap with said first mentioned electrode.

12. A piezoelectric device as set forth in claim 11, and including an insulating member surrounding said piezoelectric crystals and located in said channel; a pair of metallic end plates respectively abutting the outer ends of the piezoelectric crystals, one of said end plates abutting said abutment member of said supporting means and the other end plate abutting said circular force transmitting disc, said disc being made of metal; and said second electrode being mounted on the other end of said elongated support so that said supporting means, said metal disc, and said end plates form a mass electrically connecting said outer ends of the piezoelectric crystals to said second electrode.

13. A piezoelectric device comprising supporting means including two spaced abutments; piezoelectric crystal means disposed on said supporting means between said abutments and having one end abutting one of said abutments and another end spaced a predetermined distance from the other abutment; a manually operated member movably mounted on said supporting means and having a third abutment moving during operation of said manually operated member in a direction transverse to the direction of said predetermined distance and in a region located between said other abutment and said other end of said piezoelectric crystal means; and a circular force transmitting disc having a diameter greater than said predetermined distance and being disposed between said other abutment, said third abutment and said other end of said piezoelectric crystal means touching the same at three circumferentially spaced points of the circular periphery thereof so that said force transmitting disc is wedged between said other abutment and said other end of said piezoelectric crystal means when a force is exerted thereon by said third abutment when said manually operated member is moved toward said force transmitting disc whereby a greater force is transmitted by said force transmitting disc to said piezoelectric crystal means than is exerted on said force transmitting disc by said third abutment of said manually operated member and a voltage is created by said piezoelectric crystal means.

14. A piezoelectric device as set forth in claim 13 wherein said other abutment is a pivot pin mounted on said supporting means, and wherein said manually operated member is a lever supported on said pivot pin for turning movement and having said third abutment spaced a shorter distance from said pivot pin than from the free end thereof.

References Cited by the Examiner

UNITED STATES PATENTS

| | | | |
|---|---|---|---|
| 2,649,488 | 8/1953 | Harkness | 123—148 |
| 3,082,333 | 3/1963 | Hufferd et al. | 310—8.3 |
| 3,114,059 | 12/1963 | Hufferd et al. | 310—8.7 |
| 3,154,700 | 10/1964 | McNaney | 310—8.3 |
| 3,200,295 | 8/1965 | Owens et al. | 317—83 |
| 3,201,984 | 8/1965 | Hinnah et al. | 73—141 |

FOREIGN PATENTS

| | | |
|---|---|---|
| 606,498 | 10/1960 | Canada. |
| 1,164,141 | 2/1964 | Germany. |

RICHARD M. WOOD, *Primary Examiner.*

V. Y. MAYEWSKY, *Assistant Examiner.*